United States Patent [19]

Heaps et al.

[11] Patent Number: 4,554,319

[45] Date of Patent: Nov. 19, 1985

[54] PROCESS FOR LOW TEMPERATURE CURABLE COATING COMPOSITION

[75] Inventors: John F. Heaps, Springfield; Dennis E. Erickson, Wilbraham, both of Mass.

[73] Assignee: Monsanto Company, St. Louis, Mo.

[21] Appl. No.: 630,035

[22] Filed: Jul. 12, 1984

[51] Int. Cl.$^4$ .................... C08L 67/00; C08L 61/32; C08L 29/08
[52] U.S. Cl. ................................. 525/155; 524/315; 524/361; 524/512
[58] Field of Search ................ 525/155, 162; 524/315

[56] References Cited

U.S. PATENT DOCUMENTS

| | | | |
|---|---|---|---|
| 3,451,955 | 6/1969 | Koral et al. | 260/21 |
| 3,557,033 | 1/1971 | Brinton | 260/21 |
| 3,576,775 | 4/1971 | Jaegersberg | 260/21 |

*Primary Examiner*—Theodore E. Pertilla
*Attorney, Agent, or Firm*—Linda L. Lewis; R. Bruce Blance; William J. Farrington

[57] ABSTRACT

A process for preparing improved low temperature curable coating compositions comprising (1) forming a solution of an alkoxymethylmelamine and a styrene-allyl alcohol copolymer in a solvent and (2) adding to the solution a solution of a hydroxy-containing resin.

16 Claims, No Drawings

PROCESS FOR LOW TEMPERATURE CURABLE COATING COMPOSITION

BACKGROUND OF THE INVENTION

This invention relates to low temperature curable surface coating compositions. More particularly, it relates to a process for preparing improved curable coating compositions comprising an aminoplast, a hydroxycopolymer and a hydroxy containing resin.

It is well known in the coatings art to prepare coating compositions by dissolving in organic solvents an alkoxymethyltriazine or alkoxymethylurea and a hydroxy functional resin to provide coatings which exhibit satisfactory hardness. Efforts are also being made to cure the coatings at low temperature to conserve energy and to utilize such coatings on substrates such as wood, paper, paper board and plastics that cannot survive high temperature cure. However, low temperature cure gives coatings that are soft, have poor water and chemical resistance and poor durability.

In solvent coating systems the addition of a styrene-allyl alcohol copolymer has been found to improve the properties of coatings cured at low temperatures. The styrene-allyl copolymer is typically added to the vehicle separately from the aminoplast crosslinker. Until now, no specific procedure has been taught for the addition of the styrene-allyl alcohol copolymer to the aminoplast crosslinker or the vehicle. It has been found that the surface coating compositions obtained by the procedure described below provide improved surface coatings which exhibit superior inter coat adhesion particularly in automotive applications, where more than one coat of paint may be applied to the automobile to effect a two-tone color coating, and superior flexibility and hardness, properties which are generally mutually exclusive.

The method we have discovered consists of adding styrene-allyl alcohol copolymer to hydroxy functional resins containing an aminoplast.

Our method is achieved by (1) forming a concentrated solution of an aminoplast and a styrene-(meth)allyl alcohol in a solvent and (2) adding to the solution a non-aqueous solution of one or more hydroxy functional resins and mixing to obtain a uniform solution.

Another aspect of our invention is directed to the improved coating compositions provided by our process and to substrates coated with such compositions.

STYRENE(METH-)ALCOHOL COPOLYMER

The styrene alcohol copolymers used in the preparation of the new compositions of the invention comprise copolymers of styrene and allyl alcohol or methallyl alcohol. The molecular weight of the copolymers is in the range of about 800 to about 2500 and the hydroxy content is in the range of about 4.0 to about 10.0 weight percent and more preferably in the range of about 5.0 to about 8.0 weight percent.

THE AMINOPLAST

As used in this description the term "aminoplast" refers to any of the large number of alkoxylated amino resins which are commonly employed in the art of surface coatings. Such amino resins are characterized as being soluble in common solvents as distinguished from amino resins of the thermosetting type which are employed in molding or casting compositions. The aminoplasts which are suitable for the purpose of this invention are the alkoxymethyl derivatives of urea and of polyamino triazines selected from the group consisting of melamine, methyl-, ethyl- and benzo-guanamine.

The alkoxymethylureas can be prepared in the conventional manner by reaction of urea and formaldehyde under alkaline conditions followed by etherification with a $C_1$ to $C_4$ alcohol under acid conditions to provide a condensate with an average degree of condensation of about 3 or less and a urea:formaldehyde: alcohol ratio in the range of about 1:2–3:1–2.5. Preferably the ratio is in the range of about 1:2.2–2.8:1.3–2.2 and the ratio of formaldehyde: alcohol is at least about 1.1.

The alkoxymethylaminotriazines are substantially completely methylolated polyaminotriazines substantially fully etherified with alcohol. They can be prepared by reaction of the polyaminotriazine with formaldehyde to methylolate the amino groups and are then alkylated or etherified by reaction with alcohol. The etherified methylolated aminotriazines are liquid and are essentially monomeric or at most are oligomeric with an average degree of polymerization of no more than about 3, the aminotriazine rings being joined by methylene or methylene ether bridges formed by condensation of two methylol groups. Thus, the etherified aminotriazines within the scope of the invention possess a ratio of aminotriazine to combined formaldehyde in the range of about 1:2n–0.5 to about 1:2n where n is the number of amino groups per triazine ring and possess a ratio of aminotriazine to alkyl ether groups in the range of about 1:2n–1 to about 1:2n. The preferred aminotriazine is melamine since it has three amino groups per ring and is potentially hexafunctional. Thus, the more preferred aminotriazine compounds are the alkoxymethyl melamines in which the ratio of melamine to combined formaldehyde is in the range of 1:5.5 to 1:6 and the ratio of melamine to alkoxy groups is in the range of 1:5 to 1:6. The alcohols suitable for etherification of the methylol melamine are branched or straight chain alkyl alcohols. A mixture of alcohols such as methanol and butanol can be used for the etherification to make a mixed etherified aminoplast. A preferred mixed ether is a methoxy/butoxy mixture. The range of the ratio of methoxy/butoxy can vary widely. A preferred range is from about 2:1 to about 1:2. A single alkyl alcohol can also be used for etherification. For such an application, the preferred alcohol is methanol. Among the more preferred aminotriazine compounds is monomeric hexamethoxymethyl melamine.

THE AMINOPLAST/STYRENE-ALLYL ALCOHOL COPOLYMER SOLUTION

The solvent used for preparing the aminoplast styrene-allyl alcohol copolymer solution can be any one or a mixture of solvents. Advantageously polar solvents of solubility parameter in the range of about 8.0 to about 15 and fractional polarity in the range of about 0.07 to about 0.7, such as alcohols, ketones, ethers, glycol ethers and acetates are used. Among the alcohols are those having from 1 to 5 carbon atoms per molecule including methyl, ethyl, propyl, butyl and amyl alcohols. In addition to alcohols, ketones, such as acetone, methyl ethyl ketone, methyl isobutyl ketone and methyl amyl ketone can be used. Examples of suitable acetates are ethyl, butyl and propyl acetate. Examples of suitable glycol ethers are methyl cellosolve, cellosolve and butyl cellosolve. A preferred solvent is ethanol and mixtures thereof with other alcohols, aldehydes and ketones.

In preparing solutions of the above components, several methods can be used. The aminoplast and the styrene-allyl alcohol copolymer can be dissolved individually in the solvent and then mixed together. The aminoplast can first be dissolved in the solvent and then the styrene-allyl alcohol copolymer added to the solution. The styrene-allyl alcohol copolymer may be dissolved first in the solvent and then the aminoplast added. The styrene-allyl alcohol copolymer and aminoplast can both be added at the same time to the solvent. In the preferred method, first either the styrene-allyl alcohol copolymer or the aminoplast is dissolved in the solvent and then the second component is added to the solution and dissolved. The solution is prepared at a temperature in the range of about 20° to about 80° C. Temperatures above about 80° C. should be avoided to minimize interaction of the aminoplast and the copolymer.

Varying amounts of solvent can be used to dissolve the styrene-allyl alcohol copolymer and aminoplasts. Generally, at least 3 weight % solvent is needed to dissolve the aminoplast and/or styrene-allyl alcohol copolymer. Less than 3% will yield a solution that is too viscous. It is preferred that the amount of solvent used be in the range of 4 to 20 weight % of the total solids. Preferably the amount of solvent used is sufficient to provide a solution viscosity determined in the selected solvent at room temperature of less than about 5000 cps to facilitate the dispersion of the solution in the solution of hydroxy functional resin.

THE HYDROXY-CONTAINING RESIN

The hydroxy-containing resin can be one of a number of commercially available resins. Advantageously the hydroxy containing resin should have a hydroxy content of from about 1.3 weight percent to about 10 weight percent, preferably about 2.0 to 6.0 weight percent. Hydroxy content is defined as the weight ratio of hydroxy groups per 100 parts of solid hydroxy containing resin. Thus resin having one equivalent of hydroxy groups per 100 parts of resin would have a weight percent hydroxy content of 17/100 or 17 percent. Advantageously the hydroxy-containing resin has an acid number of at least about 2 and preferably in the range of about 6 to about 12 and may be stabilized in aqueous dispersion by neutralization with ammonia or with a volatile amine or with a hydroxyamine such as dimethylethanolamine.

Examples of suitable hydroxy containing resins are acrylic, and polyester resins which include alkyd resins as are described below.

THE ACRYLIC RESINS

The acrylic resin which can be used to prepare the coating composition is any of a number of commercially available acrylic resins. The acrylic resin is a polymer of at least one ester of an alpha-olefinic monocarboxylic acid having the general formula:

$$CH_2=\underset{R}{\overset{|}{C}}-COOR_1$$

wherein R is either hydrogen or a lower alkyl group of from 1 to 4 carbon atoms, and $R_1$ represents an alkyl, hydroxy alkyl or cycloalkyl group of from 1 to 18 carbon atoms, and one or more of the comonomers of the formula:

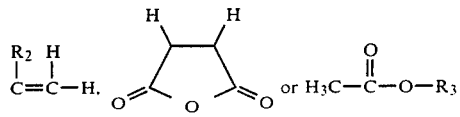

wherein
$R_2$ is H, $CH_3$ or $CH_2OH$; and $R_3$ is alkene of 2 or 3 carbon atoms.

Examples of esters of alpha-olefinic monocarboxylic acids which may be used in the present invention include methyl acrylate, ethyl acrylate, propyl acrylate, isopropyl acrylate, butyl acrylate, hexyl acrylate, octyl acrylate, 2-ethyl hexyl acrylate, cyclohexyl acrylate, decyl acrylate, stearyl acrylate, methyl methacrylate, methyl alpha-ethyl acrylate, ethyl methacrylate, butyl methacrylate, butyl alphaethyl acrylate, hydroxy propyl acrylate and lauryl methacrylate.

Examples of the comonomers which may be used in the acrylics of the present invention are phenyl allyl alcohol, glycidyl methacrylate, styrene, α-methyl styrene, acrylic acid, methacrylic acid, acrylonitrile, maleic anhydride, allyl acrylate, vinyl acrylate, allyl acetate, vinyl acetate and ethyl methacrylate.

THE ALKYD RESINS

The alkyd resins which can be used in preparing the compositions of this invention include those types normally used in baking or air drying applications. These resins can contain up to about 45 weight percent of an oil or fatty acid. When the fatty acid or oil concentration is increased above the 45 weight percent level cure response is diminished and the resulting films are soft and subject to mar and solvent attack. However, alkyd resins can be prepared which contain no fatty compound and are based upon polyols and polyacids only. These alkyd resins or oil-less alkyds are especially useful for exterior applications and have a high degree of flexibility, adhesion, and possess unique elongation properties. Preferably, though, the fatty compound should be present in an amount equal to about 20 to about 45 weight percent of the total alkyd resin solids with the most preferable range being about 35 to 45 weight percent.

In addition the particular alkyd resin which is chosen should have a solids acid value of at least 2. Lower acid value alkyds exhibit poor cure response and film resistance properties. Preferably the acid value of the selected alkyd should be in the 6 to 12 acid value range, however, alkyds with an acid value as high as 30 can also be employed with only minor stability problems.

When a fatty compound is present in the alkyd resins of this invention, it can comprise any of the fatty acids or oils ordinarily used in preparing alkyd resins. Included are the following oils and their respectively derived fatty acids: tall, safflower, tung, tallow, soya, corn, linseed, poppyseed, castor, dehydrated castor, perilla, cocoanut, oiticica, and the like. Of special usefulness are those fatty compounds wherein the fatty acid portion contains from 12 to 24 carbon atoms per molecule.

An additional component of the alkyd resins of this invention is a polyol or a mixture of polyols. Among the polyols which can be utilized are those normally used in producing alkyd resins including pentaerythritol, glycerine, trimethyol propane, trimethyol ethane and the various glycols such as neopentyl, ethylene and propylene. Preferable among the above types of polyols are triols or mixtures containing a major amount of a triol and a minor amount of tetra-alcohol.

Typical of the carboxylic acids in addition to the aforementioned fatty acids incorporated into the alkyd resins are phthalic anhydride, isophthalic acid, adipic acid, azelaic acid, benzoic acid, etc. These acids can readily be replaced by any of the additional acids normally used in alkyd resin processing. The preferred system in addition to including the aforementioned preferred levels of a fatty compound contains an aromatic dibasic acid or a mixture of such aromatic acid with an aliphatic dibasic acid.

The amount of alkyd resin that can be blended with the other components of this invention can vary from 45 to 70 solids weight percent based on the total composition solids. Preferable results, though, are obtained when the alkyd resin is present in the 55 to 65 weight percent range.

THE POLYESTER RESIN

The polyester which can be used to prepare the coating composition of this invention may be saturated, unsaturated or oil-modified such as those polyesters well known in the surface coating art. Polyesters are prepared by reacting a polyhydric alcohol (polyol) and a polybasic acid.

Such polyols include ethylene glycol, propylene glycol, butylene glycol, diethylene glycol, dipropylene glycol, triethylene glycol, neopentyl glycol, trimethylene glycol, polyethylene glycol, polypropylene glycol, 1,5-pentanediol, trimethylolethane, trimethylolpropane, glycerol, 1,2,6-hexanetriol, pentaerythritol, sorbitol, mannitol, methyl glycoside, 2,2-bis(hydroxyethoxyphenyl) propane, 2,2-bis (beta-hydroxypropoxyphenyl) propane and the like. Mono-functional alcohols may also be employed to supplement the other polyols and to control the molecular weight. Useful alcohols include those having a hydrocarbon chain comprising from about 3 to about 18 carbon atoms.

The acid component of such polyesters may include unsaturated acids such as maleic acid, fumaric acid, itaconic acid, citraconic acid, glutaconic acid, mesaconic acid, and the like, and their corresponding anhydrides where such anhydrides exist. Other polycarboxylic acids which may be utilized in addition to the above-mentioned acids include saturated polycarboxylic acids such as succinic acid, glutaric acid, adipic acid, pimelic acid, suberic acid, azelaic acid, sebacic acid, and the like. Certain aromatic polycarboxylic acids and derivatives thereof may also be useful; for example, phthalic acid, tetrahydroxyphthalic acid, hexahydroxyphthalic acid, endomethylenetetrahydroxyphthalic anhydride, tetrachlorophthalic anhydride, hexachloroendomethylene tetrahydrophthalic acid, and the like. The term acid as used in this specification includes the corresponding anhydrides, where such anhydrides exist.

In many instances it is optional to include a fatty acid. These include saturated fatty acids such as decanoic, dodecanoic, tetradecanoic, hexadecanoic, octadecanoic, docosanoic, and the like. And in addition, unsaturated fatty acids may be used such as 9-octadecenoic, 9,12-octadecadieoic, 9,12,15-octadecatrienoic, 9,11,13-octadecatrienoic, 4-keto-9,11,13-octadecatrienoic, 12-octadecatrienoic, 4-keto-9,11,13-octadecatrienoic, 12-hydroxy9-octadecanoic, 13-docosanoic, and the like.

THE COATING COMPOSITIONS

The components of the coating composition may be combined in various amounts. The amount of styrene-allyl alcohol copolymer in the composition is selected to provide the desired level of hardness in the cured coating and is advantageously in the range of 1 to 10 weight % based on the total solids of the composition. The amount of aminoplast is selected to provide a sufficient concentration of methoxymethyl groups to provide an adequate degree of crosslinking by reaction with the hydroxy groups of the styrene-allyl alcohol copolymer and the hydroxy containing resin. Advantageously the concentration of methoxymethyl groups is in the range of about 0.2 to about 2 per hydroxy group. Within such limits the amount of aminoplast is generally selected so that the weight ratio of aminoplast to styrene-allyl alcohol copolymer is in the range of about 3:2 to about 50:1, preferably from about 2:1 to about 20:1 and the weight ratio of aminoplast to hydroxy-containing resin is in the range of about 1:1 to about 1:10, and preferably from about 1:2 to about 1:9.

Solutions of adequate viscosity for coating applications, advantageously have total solids from 30 to 70 weight %. The preferred range is 40 to 60%.

In order to achieve low temperature curing using the compositions of this invention an acid catalyst can be used. Included are catalysts such as para-toluenesulfonic acid, methanesulfonic acid, butyl acid phosphate, hydrochloric acid, and other organic and mineral acids having at least one active hydrogen group per molecule. Preferred among these catalysts is para-toluenesulfonic acid. Catalyst concentration can range from about 0.25 to about 6% based on the total weight of the final coating depending upon the final end use. Thus when the coating is to be employed as a wood sealer as low as 0.25 to 1.0% catalyst can be employed. On the other hand when the coating is to be used as a topcoat more complete cure is required and therefore from 2 to 6 weight percent catalyst may be used. It should be noted that since most of the above acid catalysts are crystalline at room temperature, solutions at about 50% solids in methanol or another solvent having a boiling point of less than about 162° C. may be used to facilitate handling.

The coating composition of the invention may be colored with a pigment usually employed for coloring of such coating compositions such as an organic pigment, carbon black, titanium dioxide, and aluminum flake.

The coating composition of the invention may also have incorporated therein other additives such as wetting agents, conditioning agents, flow control agents, ultra violet stabilizers, promoters for crosslinking and antioxidants.

The application of the coating composition of the invention may be executed by a conventional method. That is, the composition is applied by brushing, roller coating, spraying with compressed air or with a petroleum solvent of low boiling point or electrostatic spraying.

The coating composition of the invention may be applied to a variety of materials such as wood, paper, paper board, glass, metal, stone, plastics and cloth.

Practical and presently preferred embodiments of the present invention are shown for illustration only in the following Examples wherein parts and percentages are by weight unless otherwise indicated.

TEST METHODS

Knoop Hardness Number (KHN) is determined by ASTM D-1474. The higher the value, the harder the coating.

Gloss is measured at 60°/20° according to ASTM-D573. Results are given in percent (%).

Cleveland Condensing Humidity Test is carried out according to ASTM D-2247-68 using a Cleveland Condensing Humidity Cabinet at 63° C.

Pencil hardness is measured according to ASTM D3363-74. Results are given in 6B, 5B, 4B, 2B, B, HB, F, H, 2H to 9H going from softest to hardest.

Impact is measured according to ASTM G14-72. Results are given in joules (J).

EXAMPLES

Aminoplast A

An aminoplast solution is prepared by dissolving 10 parts of styrene allyl alcohol copolymer containing about 70 wt % styrene and 30 weight % allyl alcohol, of weight average molecular weight 1700, in 4.3 parts ethanol at room temperature with agitation, adding 90 parts of a methoxymethyl melamine (MMM), with a melamine to formaldehyde to methanol ratio of about 1:5.7:5.5, and stirring until dissolved. The resulting aminoplast solution contains 96% by weight solids.

Aminoplast B

An aminoplast solution is prepared in the same manner as Aminoplast A except that 20 parts of styrene allyl alcohol is used with 80 parts of the methoxymethylmelamine and 7 parts of ethanol, and the solids content of the resulting solution is 92% by weight.

Aminoplast C

An aminoplast solution is prepared in the same manner as Aminoplast A, except that 20 parts of styrene allyl alcohol is used with 80 parts of methoxy butoxy methyl melamine and 8 parts of ethanol. The methoxy butoxy methyl melamine is characterized by a methoxy to butoxy ratio of 0.8:1.0 and a melamine to formaldehyde to alcohol ratio of 1:5.7:5.5. The solids content of the resulting solution is 89% by weight.

Styrene-Allyl Alcohol Copolymer Solution

A styrene-allyl alcohol solution is prepared by dissolving 70 parts of the styrene-allyl alcohol copolymer described above in 30 parts of ethanol.

Acrylic A

A thermosetting acrylic resin is used which is a hydroxy functional acrylic polymer containing 70% by weight solids in secondary butyl alcohol, with an acid value (on solids) of 72.

Acrylic B

A hydroxy-containing acrylic vehicle with a hydroxy number in the range of 120 to 160 mg KOH per g of vehicle solids into which has been dispersed an aluminum flake and the solids reduced with butyl acetate to 33% by weight acrylic and 10% by weight pigment.

Acrylic C

An hydroxy-containing acrylic vehicle with a hydroxy number in the range of 120 to 160 mg KOH per g of vehicle solids containing 54% by weight of acrylic (on solids) in xylene.

Polyester A

An oil free polyester resin with an acid number of 10 into which rutile titanium dioxide pigment has been dispersed and the solids content reduced with methyl amyl ketone to 70% by weight.

CONTROL C-1 AND EXAMPLES 1 AND 2

Examples 1 and 2 in comparison with Control C-1 demonstrate improved hardness, impact and chemical resistance at low temperature cure conditions for coatings prepared by our method. Examples 1 and 2 are prepared by combining a single solution of aminoplast and styrene allyl alcohol (e.g., Crosslinker A or B) with Acrylic A. Control C-1 is identical to Example 2, except that the aminoplast and the styrene allyl alcohol copolymer are prepared in separate solutions and added separately to Acrylic A.

Coating compositions shown in Table I are prepared by mixing Acrylic A with methylamyl ketone and an aminoplast. The coatings are applied with draw down blades at room temperature to cold rolled steel pannels treated with zinc phosphate and primed with a pigmented epoxy coating about 1 mil thick and baked at 162° C. for 30 min. The films are baked for 10 min. at 77° C. (designated L for low) or 20 min at 104° C. (designated H for high).

The results of testing the resulting coatings are shown in Table II. In a comparison of Examples 1 and 2 to Control C-1, at low temperature cure conditions, an improvement in KNH, impact and chemical resistance is observed. In the condensing humidity test, Ex-2 for low temperature cure condition shows far superior gloss retention after 24 hrs. of exposure to that of C-1. Comparing Examples 1 and 2 to Control C-1 at high temperature cure conditions, an improvement in KHN, chemical resistance to HCl, and gloss retention after 250 hrs. of exposure to condensing humidity is observed.

TABLE I

| COATING COMPOSITION | | | |
|---|---|---|---|
| | Ex-1 | Ex-2 | C-1 |
| Acrylic A | 117 | 117 | 117 |
| Aminoplast A | 37 | | |
| Aminoplast B | | 38 | |
| MMM[1] | | | 32 |
| Styrene Allyl Alcohol | | | 5.83 |
| Methyl Amyl Ketone | 83 | 85 | 82 |

[1]Described in Aminoplast A

TABLE II

| COATING TESTING | | | |
|---|---|---|---|
| Sample | Ex-1 | Ex-2 | C-1 |
| Baking Conditions | (L/H) | (L/H) | (L/H) |
| Gloss (20°) | 88/97 | 88/97 | 88/97 |
| Pencil Hardness | B/2H | B/2H | 2B/2H |
| KHN | 1.5/12 | 2.7/13.6 | 1/11.5 |
| Impact | 2.26/6.78 | 2.26/6.78 | 1.13/6.78 |
| Chemical Resistance | | | |
| 5% NaOH[1] Appearance[2] | 9/10 | 9.5/10 | 7.5/10 |
| 2.5N HCl[1] Appearance[2] | 7.5/9 | 7.5/10 | 7/8 |
| Condensing Humidity | | | |
| After 24 hrs. Appearance[2] | 2/10 | 2/10 | 1/10 |
| % Original Gloss After 250 hrs. | 16/88 | 61/90 | 2/85 |

TABLE II-continued

| Sample | COATING TESTING | | |
|---|---|---|---|
|  | Ex-1 | Ex-2 | C-1 |
| % Original Gloss | —/75 | —/86 | —/71 |

[1]30 minutes exposure at 38° C.
[2]Visual inspection 10 to 0; 10 the best and 0 the poorest

EXAMPLE 3

Example 3 demonstrates the inter coat adhesion achieved with our coating process. The formulas for base coat and clear coat are shown in Table III. The coatings are sprayed at room temperature onto cold rolled steel panels treated with zinc phosphate and primed with a pigmented epoxy coating about one mil thick and baked at 162° C. for 30 minutes. The base coat is sprayed onto the primer coating to a thickness of about 0.7 mil. The clear coat is then sprayed on to provide a thickness of about 1.3 mil. The panel is baked at 143° C. for 60 minutes. A second coating of base coat and clear coat is applied as above to the panel and baked at 129° C. for 17 minutes.

The panel is tested for inter coat adhesion by cutting a cross hatch of 0.32 cm on spacings at right angles and diagonally in one direction. Adhesive tape (No. 898, 25 mm wide available from Minnesota Mining and Manufacturing Co.) is applied by pressing firmly and removing with an upward motion at medium speed. The amount of chipping, flaking or general poor adhesion is observed and the per cent adhesion determined.

The coating of Example 3 is found to have 100% adhesion initially and also after three months of aging.

A second coating identical to that of Example 3 is made, except that 100 parts of methoxy butoxy methyl melamine (as described in Aminoplast C) in 8 parts of ethanol is substituted for Aminoplast C. The coating is found to have 100% adhesion initially but only 25% adhesion after 3 months of aging.

TABLE III

| | EXAMPLE 3 | |
|---|---|---|
| | Base Coat | Clear Coat |
| Acrylic B | 200 | |
| Acrylic C | | 200 |
| Aminoplast C | 35.5 | 58 |
| Catalyst[1] | 1.25 | 1.75 |
| Butyl Acetate | 25 | |
| Xylene | | 30 |

[1]A blocked sulfonic acid catalyst.

EXAMPLE 4 AND CONTROL 2

The coatings of Example 4 and Control 2 demonstrate the improved flexibility and hardness of the coatings prepared by our process.

Coating compositions shown in Table IV are prepared by mixing Polyester A with xylol, an aminoplast and p-toluene sulfonic acid. The coatings are applied with drawn down blades at room temperature to a primed galvanized steel coil stock panel and baked for 42 seconds in an oven at 310° C. The panels are tested for flexibility by the T-bend test where the coated panel is deformed 180° and inspected for fracturing of the coating at the bend. The first deformation is designated T-O. The panel is then deformed another 180° around the first fold resulting in a flattened roll and designated T-1. The third is designated T-2 and so on. As each bend is added, the radius of curvature increases with the thickness of the flattened roll. Therefore, the lowest level of bends without fracture indicates the greatest flexibility.

TABLE IV

| | COIL COATINGS | |
|---|---|---|
| | Ex-4 | C-2 |
| Polyester A | 85 | 85 |
| Aminoplast B | 5.1 | |
| MMM[1] | | 3.6 |
| Styrene Allyl Alcohol | | 1.5 |
| Xylol | 8.0 | 8.0 |
| p-toluene sulfonic acid | 0.7 | 0.7 |
| KHN | 13.5 | 13.2 |
| T-Bends | T-2 | T-3 |

[1]Described in Aminoplast A

We claim:
1. A process for preparing a coating composition which comprises:
(1) forming a solution of an aminoplast selected from the group consisting of alkoxymethyl derivatives of urea, melamine and methyl-, ethyl- and benzoguanamines and a styrene-(meth)allyl alcohol copolymer in a polar solvent; and
(2) admixing the solution with a non-aqueous solution of a hydroxy-containing resin to obtain a uniform solution;
wherein the styrene-(meth)allyl alcohol copolymer has a molecular weight in the range of about 800 to about 2500 and a hydroxy content in the range of about 4.0 to about 10.0 weight percent and wherein the hydroxy-containing resin is selected from the group consisting of acrylic and polyester hydroxyl-containing resins, and has hydroxy content of from about 1.3 weight percent to about 10 weight percent.
2. The process according to claim 1 wherein the aminoplast is a methoxymethylmelamine and the styrene-(meth)allyl alcohol copolymer has a hydroxy content in the range of about 5.0 to about 8.0 weight percent.
3. The process according to claim 1 wherein the aminoplast is a mixed ether alkoxymethyl melamine wherein the alkoxy consists of methoxy and butoxy.
4. The process according to claim 2 wherein the methoxymethylmelamine has a combined ratio of melamine to formaldehyde to methanol in the range of about 1:5.5:5 to about 1:6:6.
5. The process of claim 1 wherein the viscosity of the solution of aminoplast and styrene-(meth)allyl alcohol copolymer is less than 5000 cps.
6. A process for preparing a coating composition which comprises:
(1) forming a solution of an aminoplast selected from the group consisting of alkoxymethyl derivatives of urea, melamine and methyl-, ethyl- and benzoguanamines and a styrene-(meth)allyl alcohol copolymer in a polar solvent wherein the ratio of aminoplast to styrene(meth)allyl alcohol copolymer is in the range of about 3:2 to about 50:1;
(2) admixing the solution with a non-aqueous solution of one or more hydroxy-containing resins to obtain a uniform solution wherein the ratio of aminoplast to hydroxy-containing resin is in the range of about 1:1 to about 1:10;
wherein the styrene-allyl alcohol copolymer has a molecular weight in the range of about 800 to 2500 and a hydroxy content in the range of about 4.0 to 10.0 weight percent and comprises from about 1 to about 10 weight percent of the total solids of the coating composition;

and wherein the hydroxy-containing resin is selected from the group consisting of acrylic and polyester hydroxyl-containing resins, and has hydroxy content of from about 1.3 weight percent to about 10 weight percent and wherein the total solids of the coating composition is from 30 to 70 weight %.

7. The process according to claim 6 wherein the aminoplast is a methoxymethylmelamine and the styrene-(meth)allyl alcohol copolymer is a styrene-allyl alcohol copolymer with a hydroxy content of about 5.0 to about 8.0 weight percent.

8. The process according to claim 7 wherein the methoxymethylmelamine has a combined ratio of melamine to formaldehyde to methanol in the range of about 1:5.5:5 to about 1:6:6.

9. The process according to claim 6 wherein the aminoplast is a mixed ether alkoxymethylmelamine wherein the alkoxy consists of methoxy and butoxy.

10. A process for preparing a coating composition which comprises:
(1) forming a solution of styrene-allyl alcohol copolymer of molecular weight in the range of about 800 to 2500 and a hydroxy content of about 4.0 to about 10.0 and hexamethoxymethylmelamine in a polar solvent wherein the ratio of hexamethoxymethylmelamine and styrene-allyl alcohol copolymer is in the range of about 3:2 to 50:1; and
(2) adding to the solution a non-aqueous solution of one or more hydroxy-containing resins and mixing to obtain a uniform solution wherein the ratio of hexamethoxy methylmelamine to hydroxy-containing resin is in the range of about 1:1 to about 1:10;
wherein about 1 to about 10 weight % of the total solids of the coating composition is the styrene-allyl alcohol copolymer; and wherein the hydroxy-containing resin is selected from the group consisting of acrylic and polyester hydroxyl-containing resins, and has hydroxy content of from about 1.3 weight percent to about 10 weight percent and wherein the total solids of the coating composition is from 30 to 70 weight %.

11. The coating composition prepared by the process of claim 1.

12. The coating composition prepared by the process of claim 6.

13. The coating composition prepared by the process of claim 10.

14. An article coated with the coating composition of claim 11.

15. An article coated with the coating composition of claim 12.

16. An article coated with the coating composition of claim 13.

* * * * *